(12) United States Patent
Lang

(10) Patent No.: US 6,364,345 B1
(45) Date of Patent: Apr. 2, 2002

(54) AIR BAG MODULE FOR A VEHICLE OCCUPANT RESTRAINT SYSTEM

(75) Inventor: Norbert Lang, Leinzell (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/646,576

(22) PCT Filed: Mar. 25, 1999

(86) PCT No.: PCT/EP99/02039

§ 371 Date: Sep. 19, 2000

§ 102(e) Date: Sep. 19, 2000

(87) PCT Pub. No.: WO99/51464

PCT Pub. Date: Oct. 14, 1999

(30) Foreign Application Priority Data

Apr. 20, 1998 (DE) .................................. 298 06 083 U

(51) Int. Cl.$^7$ ............................................... B60R 21/20
(52) U.S. Cl. ....................... 280/728.3; 280/732; 16/287
(58) Field of Search ........................ 280/728.2, 728.3, 280/732; 403/119; 16/287, 288, 368; 49/364, 379

(56) References Cited

U.S. PATENT DOCUMENTS

| 5,301,966 A | * | 4/1994 | Sakata ........................ 280/732 |
| 5,344,184 A | * | 9/1994 | Keeler et al. ................ 280/732 |
| 5,411,288 A |   | 5/1995 | Steffens, Jr. |
| 5,431,433 A |   | 7/1995 | Steimke et al. |
| 5,641,178 A | * | 6/1997 | Lee ........................... 280/728.3 |
| 6,024,377 A | * | 2/2000 | Lane, Jr. .................... 280/728.3 |
| 6,068,286 A |   | 5/2000 | Heilig |

FOREIGN PATENT DOCUMENTS

| DE | 3708744 |   | 4/1988 |
| DE | 4217177 |   | 11/1993 |
| DE | 4233749 |   | 4/1994 |
| DE | 4419738 C1 | * | 8/1995 |
| DE | 19704501 |   | 8/1997 |
| DE | 29721644 |   | 5/1998 |
| DE | 29721681 |   | 5/1998 |
| DE | 19757435 |   | 7/1998 |
| EP | 0680852 |   | 11/1995 |
| JP | 05050893 |   | 3/1993 |
| JP | 05058244 | * | 3/1993 |
| JP | 07164989 |   | 6/1995 |

* cited by examiner

Primary Examiner—Lanna Mai
Assistant Examiner—Rith Ilan
(74) Attorney, Agent, or Firm—Tarolli, Sundheim, Covell, Tummino & Szabo L.L.P.

(57) ABSTRACT

A gas bag module for a vehicle occupant restraint system, including a housing (10) for a gas generator and a gas bag which can be unfolded by the latter, and having a cover (16, 18) which can be converted from a closed position into an open position, the cover (16, 18) being connected to the housing (10) by means of at least one hinge (30), is characterized in that the cover (16, 18) is connected to a swivel section (20) which in turn is connected to the housing (10) by means of the hinge (30).

9 Claims, 8 Drawing Sheets

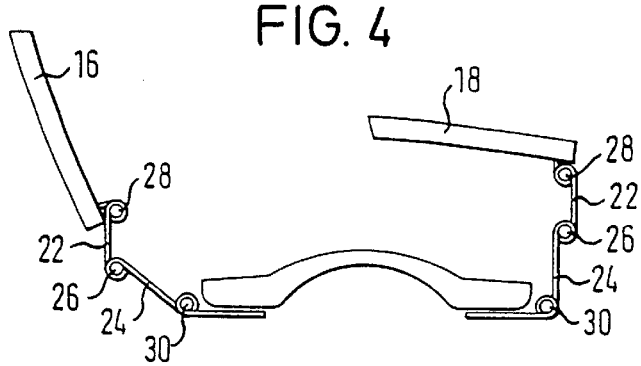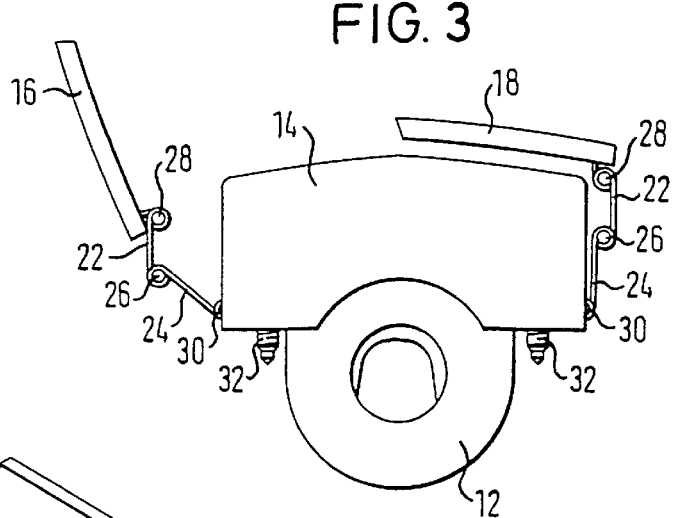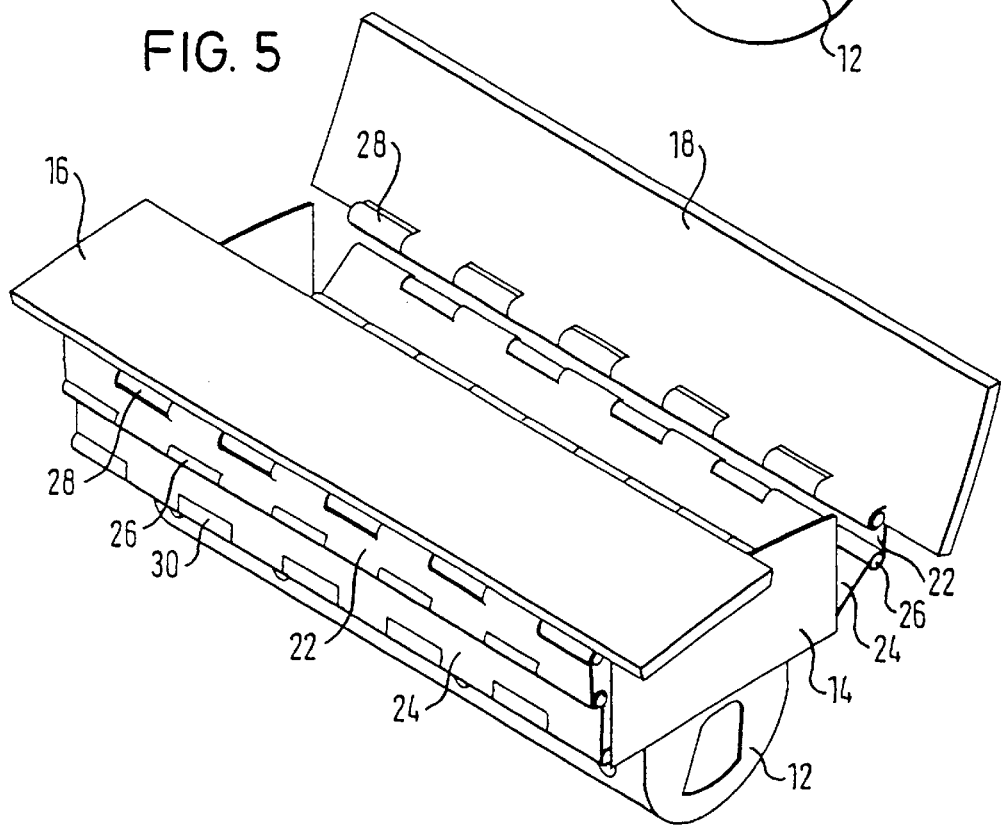

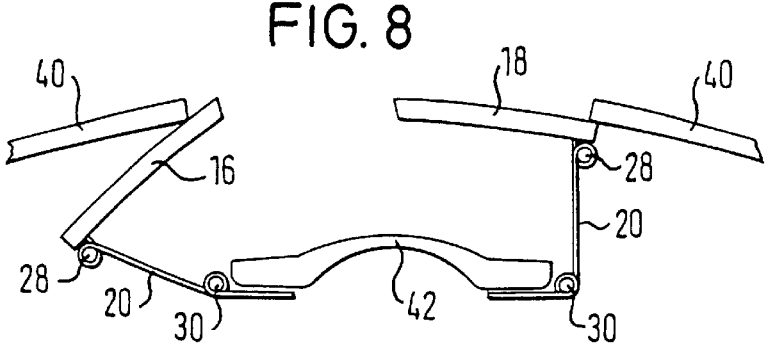
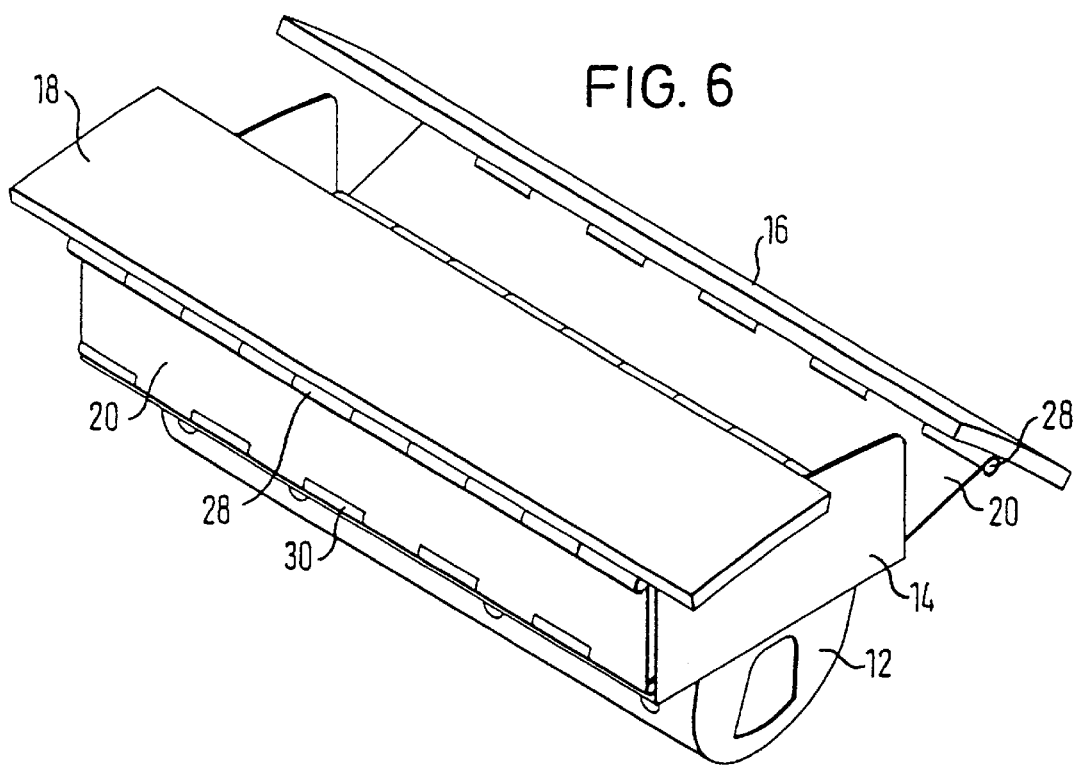
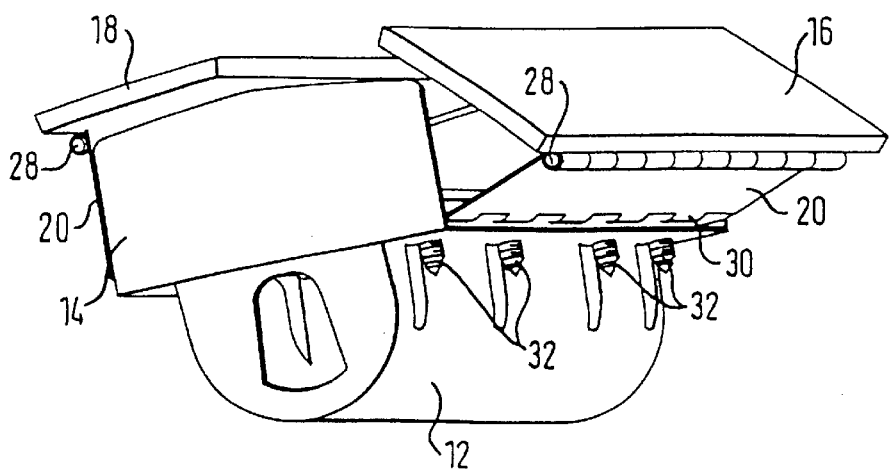

US 6,364,345 B1

AIR BAG MODULE FOR A VEHICLE OCCUPANT RESTRAINT SYSTEM

BACKGROUND OF THE INVENTION

The invention relates to a gas bag module for a vehicle occupant restraint system, comprising a housing for a gas generator and a gas bag which can be unfolded by the latter, and comprising a cover which can be converted from a closed position into an open position, the cover being connected to the housing by means of at least one hinge and the cover being connected to a swivel section which in turn is connected to the housing by means of the hinge.

Such a gas bag module is known from EP 0 680 852. Here, the cover is opened by the deploying gas bag after activation of the gas generator. Since the cover of such a gas bag module is connected with one of its outer rims to either the housing or a surrounding vehicle panelling, the cover will swing into the inside of the vehicle space when opening. This results in the risk for the vehicle occupant of being hit by the cover as it opens. Further, the force for opening the cover has to be made available exclusively by the deploying gas bag.

BRIEF SUMMARY OF THE INVENTION

The invention provides a gas bag module in which the cover presents no risk for the occupant of being hit by the cover and in which the force for opening the cover is made available at least in part by an element which assists the opening action. A gas bag module of the type initially mentioned is distinguished according to the invention in that a spring is provided which biases the swivel section, with respect to the housing, into a position which corresponds to the open position of the cover. The use of a swivel section additionally enables the opening cover to swing away from an occupant, whereby any impact risk is reduced or even eliminated.

Advantageous developments of the invention read from the subclaims.

BRIEF DESCRIPTION OF THE DRAWINGS

In the following, the invention is described with reference to various embodiments illustrated in the attached drawings, in which

FIG. 3 shows a side view of the gas bag module according to the first embodiment with the cover partly open;

FIG. 4 shows the gas bag module of FIG. 3 where some components have been omitted in the interest of better clarity;

FIG. 5 is a perspective view of the gas bag module of FIG. 3;

FIG. 6 shows a perspective view of a gas bag module according to a second embodiment of the invention, with the cover partly open;

FIG. 7 provides another perspective view of the gas bag module of FIG. 6;

FIG. 8 shows the gas bag module of FIG. 7 in a side view in which some components have been omitted for better clarity;

DETAILED DESCRIPTION OF THE INVENTION

Figure 1:
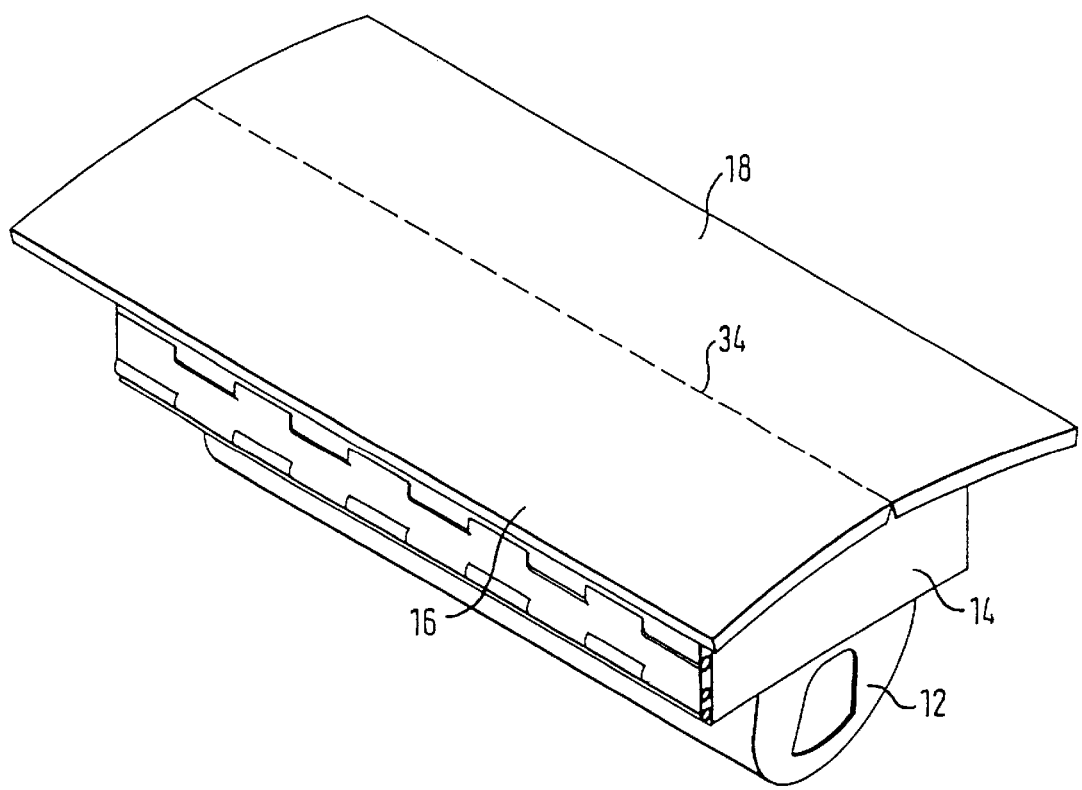
FIG. 1 shows a perspective view of a gas bag module according to a first embodiment of the invention with a closed cover.

FIGS. 1 to 5 illustrate a gas bag module according to a first embodiment of the invention. The gas bag module contains a housing 10 which comprises a lower part 12 to house a gas generator, and an upper part 14 to house a gas bag. The open side of the upper part 14, intended for the emergence of the gas bag, is closed by a cover which consists of two components 16, 18. Each component of the cover is connected to the housing 10 by means of a swivel section 20. Each swivel section consists of two components 22, 24, which are connected to each other by means of a hinge 26. Each component 22 is connected to the corresponding component of the cover by means of a hinge 28, and each component 24 is connected to the housing by means of a hinge 30. The hinges 30 are attached to the upper part 14 of the housing 10 by means of screw bolts 32.

The three hinges 26, 28, 30 extend in parallel to each other and along one of the longitudinal sides of the upper part 14 of the housing 10. The lower hinge 30, which connects the swivel section 22, 24 with the housing, extends along the longitudinal edge of the upper part 14 facing the lower part 12 of the housing.

Figure 2:
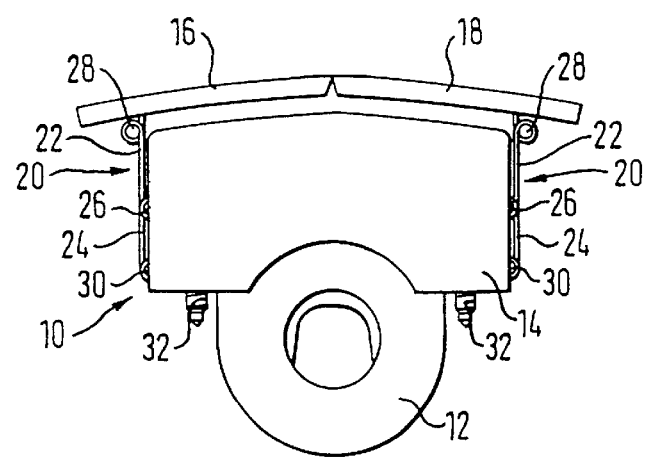
FIG. 2 shows a side view of the gas bag module of FIG. 1.
Figure 9:
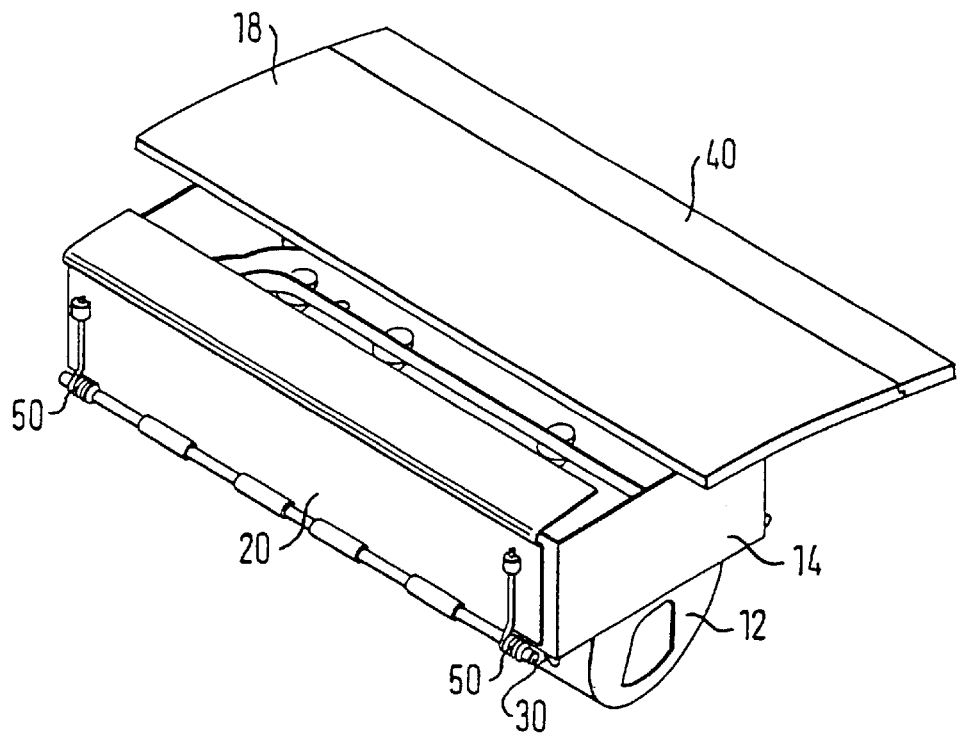
FIG. 9 is a perspective view of a gas bag module according to a third embodiment of the invention, where part of the cover has been omitted in the interest of better clarity.
Figure 10:
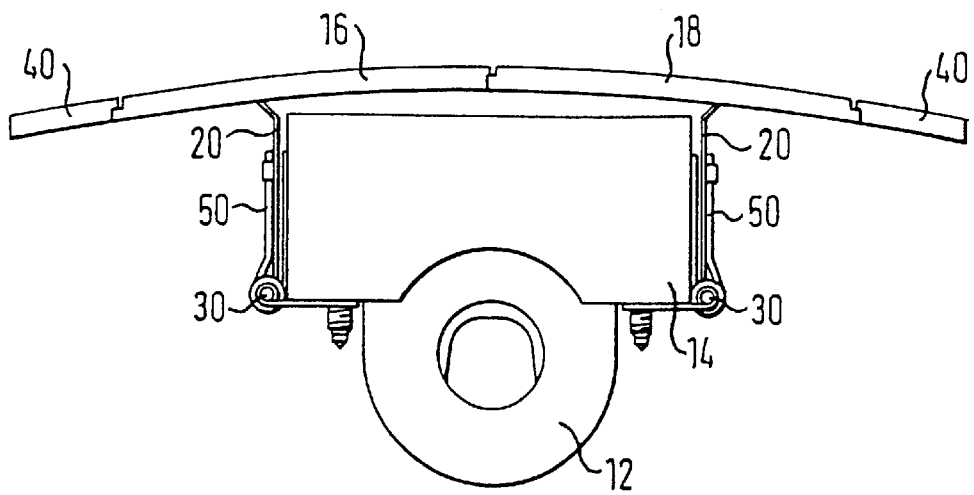
FIG. 10 is a side view of the gas bag module of FIG. 9.
Figure 11:
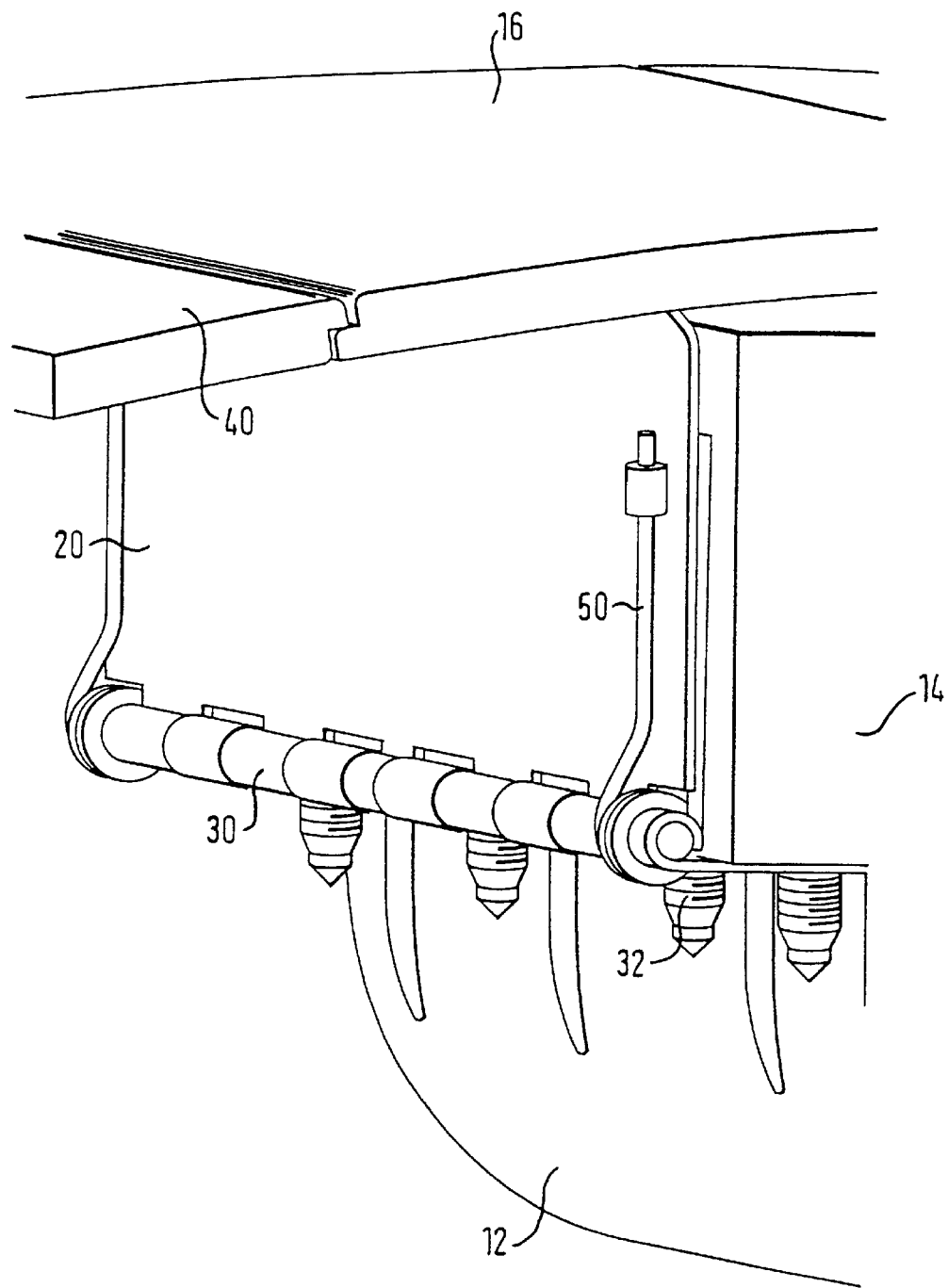
FIG. 11 is a partial perspective view of the gas bag module of FIG. 9.
Figure 12:
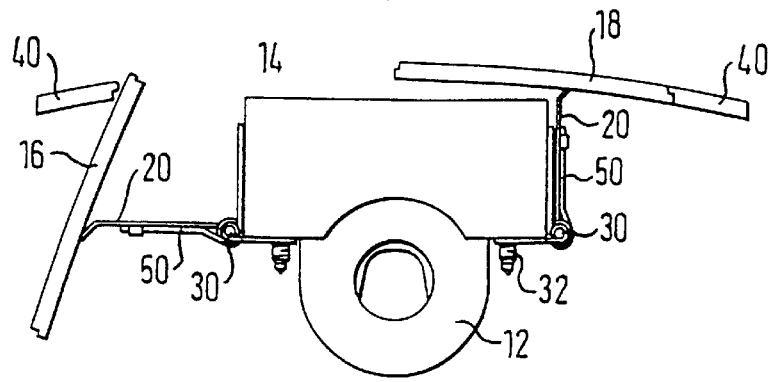
FIGS. 12 and 13 are side views of a gas bag module according to the third embodiment of the invention, where the cover is shown open in part and fully open, respectively.
Figure 13:
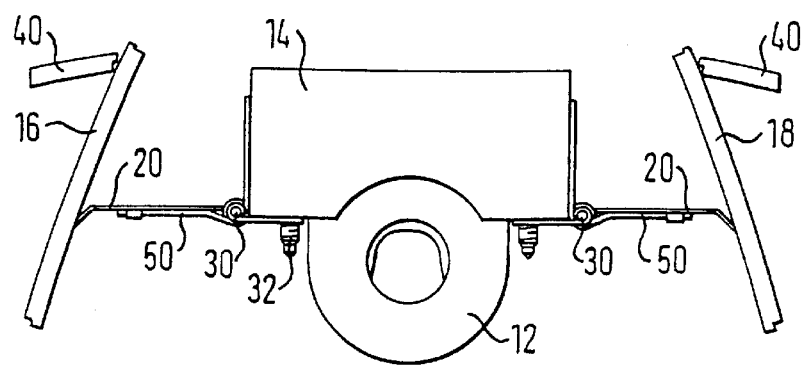
Figure 14:
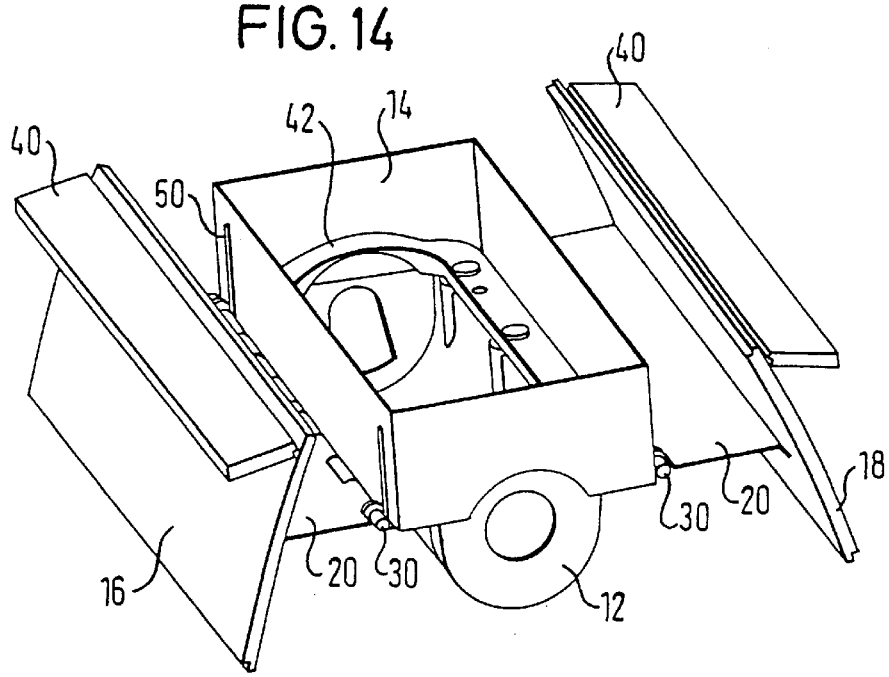
FIG. 14 is a perspective view of the gas bag module of FIG. 13.
Figure 15:
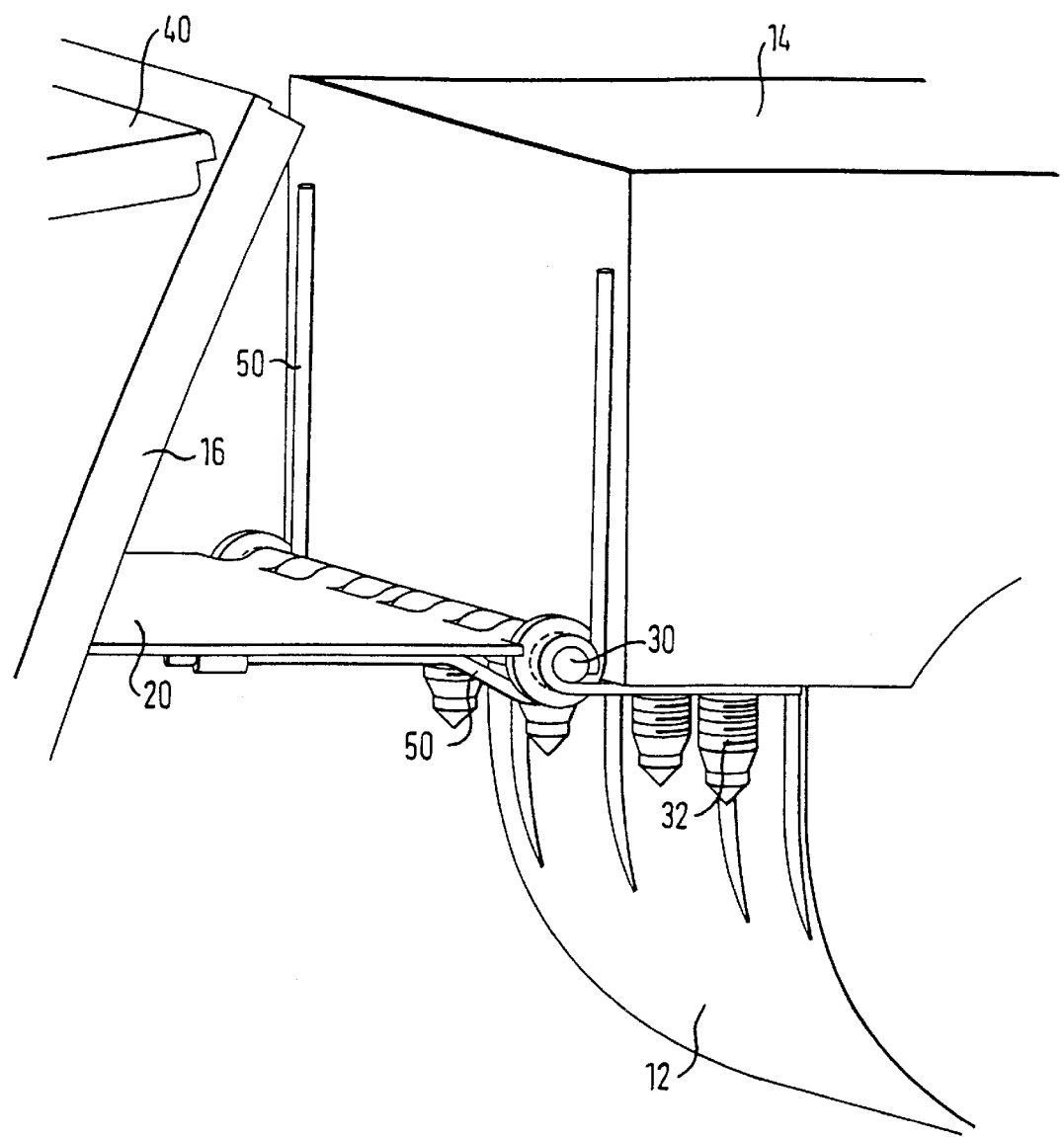
FIG. 15 shows a partial perspective view of the gas bag module of FIG. 14.

From the position shown in FIGS. 1 and 2, where the two components 16, 18 of the cover adjoin each other along a parting line 34, the cover can be brought into an open position. In this position, both cover parts 16, 18 are open. For better intelligibility, FIGS. 3 to 5 show the gas bag module with only one component of the cover being open. Here it can be seen that the corresponding component, in this particular case component 16, is displaced towards the lower part 12 of the housing 10 when it is brought into its open position. It can be clearly seen that the hinge 28 of the opened component 16 is moved downwards during the opening process, that is away from a vehicle occupant to be restrained by the gas bag module. This displacement is due in particular to the fact that the swivel axis of the swivel section, formed by the hinge 30, is located at a distance from a plane which is defined by the cover in the closed state.

FIGS. 6 to 8 illustrate a gas bag module according to a second embodiment of the invention. Unlike the first embodiment, the swivel section 20 in this arrangement has a one-piece structure. Adjoining the components 16,18 of the cover, an inner space panelling 40 of the vehicle is shown, in which the gas bag module is arranged. Further, a securing frame 42 for a gas bag (not illustrated) is shown schematically inside the upper part, which bag may be arranged inside the upper part 14.

It can be seen that, on opening, each component of the cover disappears behind the inner space panelling 40. This is assured by the coordinated action of both the hinges 28 and 30 as well as the swivel section 20, which may be swivelled relative to the corresponding cover part as well as to the housing. Since the components of the cover disappear behind the inner space panelling 40, there is no risk for the vehicle occupant of being hit by the cover.

FIGS. 9 to 15 show a gas bag module according to a third embodiment of the invention. In contrast to the first and second embodiments, no hinge is here provided between the swivel section and the corresponding component of the cover; the swivel section 20 is rigidly connected to the corresponding component 16, 18 of the cover. A leg spring 50 is furthermore provided, one leg of which is secured to the housing and the other to the swivel section 20. This leg spring 50 biases the swivel section 20 into a position corresponding to that one with open cover; in other words, it attempts to pivot the swivel parts 20 outwards and away from the upper part 14 of the housing 10. The coiled part of the leg spring 50 is concentric with the swivel axis of the hinge 30.

When in their closed position, both the opposing outer edges of the two components 16, 18 of the cover make contact with their facing edges of the inner space panelling 40. In this way, a supporting force is provided which acts against the force exerted by the leg spring 50. In addition, the facing edges of the components 16, 18 of the cover may be embodied in a way as illustrated in FIGS. 16 to 18.

Figure 16:
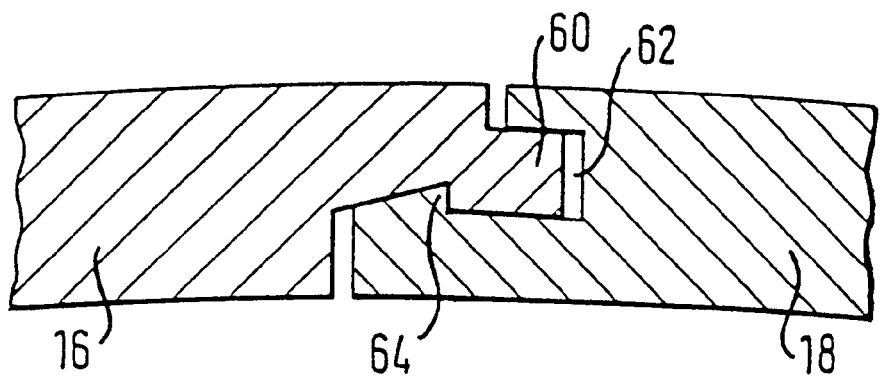
FIGS. 16 to 18 show broken sectional views of different embodiments of the parting line between two cover parts.

As illustrated in FIG. 16, component 16 is provided with a lip 60 which engages into a corresponding recess 62 of the component 18. The component 18 is provided with a latching protrusion 64 which engages with the shoulder of the lip 60 of component 16. In this way a latching connection is formed which is capable of transmitting traction forces, tending to separate the two components 16, 18, up to a predetermined limit. The traction forces which may be transmitted also act to oppose the pressure provided by the leg springs 50.

Figure 17:
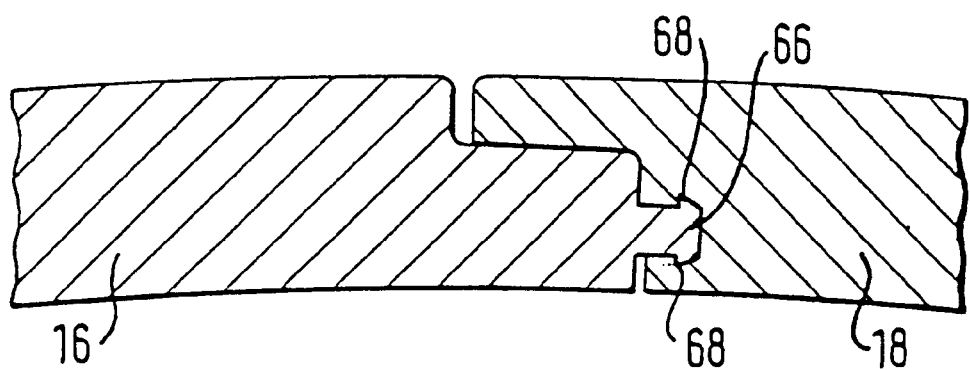

FIG. 17 shows that the component 16 is provided with a symmetrical lip 66 which has a protrusion 68 on both sides. The lip 66 mates with a complementary recess in the component 18. This makes it possible to transmit traction forces up to a predetermined limit.

Figure 18:
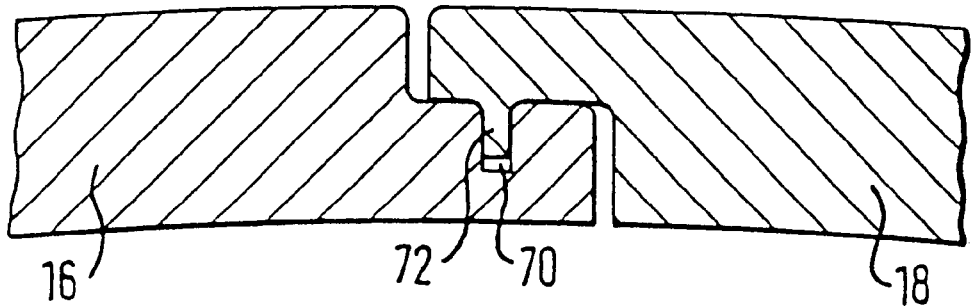

FIG. 18 shows that the component 18 is provided with a web 70 which extends in parallel to the swivel axis determined by the hinge 30, and is generally at a right angle to a plane defined by the component 18. The web 70 engages in a complementary groove 72 in the component 16. This embodiment is also capable of transmitting traction forces between the two components 16, 18.

When the gas bag located inside the upper part 14 is activated, it provides a thrust action on the two components 16, 18 of the cover. These are then swivelled to a slight degree so that their outer rims, in contact with the inner space panelling 40, are pushed under the inner space panelling. At the same time, there is exerted such a force on the components 16, 18 that the traction force transmittable by the latching connection between the two components is exceeded. The two cover parts 16, 18 are then shifted outwards under the inner space panelling 40, assisted by the leg spring 50. Due to the pre-determined swivel path, there occurs no risk for a vehicle occupant of being hit by the cover.

What is claimed is:

1. A gas bag module for a vehicle occupant restraint system, comprising a housing (10) for a gas generator and a gas bag which can be unfolded by the gas generator, and comprising a cover (16, 18) which can be converted from a closed position into an open position, the cover (16, 18) being connected to the housing (10) by a connection comprising at least one hinge (30) and a swivel section (20), wherein the cover (16, 18) is connected to the swivel section (20) which in turn is connected to the housing (10) by means of the hinge (30), characterized in that a spring (50) is provided which biases the swivel section (20), with respect to the housing (10), into a position which corresponds to the open position of the cover (16, 18).

2. The gas bag module according to claim 1, characterized in that the spring is a leg spring (50), one leg of which is connected to the housing (10) and the other to the swivel section (20).

3. The gas bag module according to claim 1, characterized in that a second hinge (28) is provided between the cover (16, 18) and the swivel section (20).

4. The gas bag module according to claim 3, characterized in that the hinge (30) between the housing (10) and the swivel section (20) extends in parallel to the hinge (28) between the swivel section (20) and the cover part (16, 18).

5. The gas bag module according to claim 1, characterized in that the swivel part (20) has a two-piece structure, a third hinge (26) being provided between the two components (22, 24).

6. The gas bag module according to claim 1, any one of the preceding characterized in that the hinge (30) between the swivel section (20) and the housing (10) is arranged at a distance from a plane defined by the cover (16, 18).

7. The gas bag module according to claim 1, characterized in that the housing (10) comprises a lower part (12) to house the gas generator, and an upper part (14) to house the gas bag, that the upper part (14) is box-shaped and the hinge (30) between the swivel section (20) and the housing (10) extends along an edge of the upper part (14) facing the lower part (12) of the housing (10).

8. The gas bag module according to claim 1, characterized in that the cover consists of two components (16, 18) which each are connected to the housing (10) by means of a respective swivel section (20).

9. The gas bag module according to claim 8, characterized in that the two components (16, 18) engage each other in such a way that a traction force, tending to separate the two components (16, 18), can be resisted up to a predetermined limit.

* * * * *

UNITED STATES PATENT AND TRADEMARK OFFICE
CERTIFICATE OF CORRECTION

PATENT NO.   : 6,364,345 B1
DATED        : April 2, 2001
INVENTOR(S)  : Norbert Lang It is certified that error appears in the above-identified patent and that said Letters Patent is hereby corrected as shown below:

<u>Column 4,</u>
Line 35, after "claim 1", delete -- any one of the preceding --.

Signed and Sealed this

Twelfth Day of November, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.     : 6,364,345 B1
DATED          : April 2, 2002
INVENTOR(S)    : Norbert Lang It is certified that error appears in the above-identified patent and that said Letters Patent is hereby corrected as shown below:

<u>Title page,</u>
Item [30], Foreign Application Priority Data, delete "Apr. 20, 1998" and insert -- April 2, 1998 --.

Signed and Sealed this

Thirtieth Day of September, 2003

JAMES E. ROGAN
*Director of the United States Patent and Trademark Office*